(12) United States Patent
Boyd et al.

(10) Patent No.: US 6,988,110 B2
(45) Date of Patent: Jan. 17, 2006

(54) STORAGE SYSTEM CLASS DISTINCTION CUES FOR RUN-TIME DATA MANAGEMENT

(75) Inventors: Kenneth Wayne Boyd, Tucson, AZ (US); Robert Charles Friske, Milford, MI (US); Robert Allen Hood, Boca Raton, FL (US); Matthew Joseph Kalos, Tucson, AZ (US); Robert Frederic Kern, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 469 days.

(21) Appl. No.: 10/422,500

(22) Filed: Apr. 23, 2003

(65) Prior Publication Data

US 2004/0215589 A1 Oct. 28, 2004

(51) Int. Cl.
G06F 17/30 (2006.01)
(52) U.S. Cl. .................... 707/103 R; 707/1; 707/100; 707/101; 707/102; 707/104.1
(58) Field of Classification Search .................... 707/1, 707/100, 101, 102, 103 R, 104.1
See application file for complete search history.

(56) References Cited

U.S. PATENT DOCUMENTS

| | | | | |
|---|---|---|---|---|
| 4,541,019 | A | * | 9/1985 | Precourt ...................... 360/15 |
| 4,755,928 | A | * | 7/1988 | Johnson et al. ................ 714/6 |
| 4,947,367 | A | * | 8/1990 | Chang et al. ................. 710/65 |
| 5,144,501 | A | * | 9/1992 | Inazawa et al. ............... 360/48 |
| 5,438,674 | A | * | 8/1995 | Keele et al. .................... 711/4 |
| 5,596,707 | A | * | 1/1997 | Ohta ............................. 714/6 |
| 5,668,948 | A | * | 9/1997 | Belknap et al. ............. 709/231 |
| 5,710,676 | A | * | 1/1998 | Fry et al. .................... 360/72.1 |
| 5,881,311 | A | | 3/1999 | Woods ........................ 395/824 |
| 5,900,007 | A | | 5/1999 | Nunnelley et al. ............. 711/4 |
| 6,029,179 | A | * | 2/2000 | Kishi ........................ 707/202 |
| 6,047,322 | A | | 4/2000 | Vaid et al. ................... 709/224 |
| 6,330,621 | B1 | | 12/2001 | Bakke et al. .................. 710/5 |
| 6,463,470 | B1 | | 10/2002 | Mohaban et al. ........... 709/223 |
| 6,549,992 | B1 | * | 4/2003 | Armangau et al. ......... 711/162 |
| 6,778,346 | B2 | * | 8/2004 | Takayama et al. ............ 360/69 |

(Continued)

FOREIGN PATENT DOCUMENTS

| | | |
|---|---|---|
| WO | WO0010334 | 2/2000 |
| WO | WO0076129 A1 | 12/2000 |

OTHER PUBLICATIONS

Practice and Experience, "A customisable memory management framework for C++", Attardi et al., vol. 28, No. 11, pp. 1143-1183, Sep. 1998.

(Continued)

*Primary Examiner*—Frantz Coby
(74) *Attorney, Agent, or Firm*—John H. Holcombe (57) ABSTRACT

A data management system has at least one class distinction cue associated with a class of data entities. The class distinction cue comprises data management guidance information and priority information related to the associated class of data entities. For a data entity, at run-time, a data management allocation run-time system references the class distinction cue or cues prior to conducting data management allocation or access, and, based on the priority information as compared to other priority information related to the data storage resources, selectively allocates the data storage resources and provides the operations of the storage system in the data management allocation system for the data entity.

41 Claims, 3 Drawing Sheets

U.S. PATENT DOCUMENTS

2002/0015249 A1 * 2/2002 Takayama et al. ............ 360/48

OTHER PUBLICATIONS

Computers in Physics, "Extending Python Object-oriented language", Dubois et al., vol. 10, No. 4, pp. 359-365, Jul.-Aug. 1996.

IBM Technical Disclosure Bulletin, "Including Transition Rules in Management Class Definition", vol. 32, No. 11, p. 93, Apr. 1990.

ACM Digital Library, "Matching Data Storage To Application Needs", Dean et al., pp. 68-73, 1993.

* cited by examiner

STORAGE SYSTEM CLASS DISTINCTION CUES FOR RUN-TIME DATA MANAGEMENT

FIELD OF THE INVENTION

This invention relates to data management for managing data of a storage system, and, more particularly, for managing data in a storage system having a plurality of data storage resources of different characteristics, and managing data entities of the storage system by allocating the data storage resources.

BACKGROUND OF THE INVENTION

Data management typically comprises storing data entities at selected data storage resources for subsequent access and/or archival purposes. One example of a data management system comprises a data migration system in which a new data entity is initially stored in a cache memory, and destaged to a disk drive system, such as a RAID system, and, as the data entity ages, it is migrated to a slower access system, such as an optical or magnetic tape data storage library with removable media, and then the removable media is archived on storage shelves. Another example of a data management system is a backup system, in which a copy of the data entity is produced and stored at duplicate and/or remote data storage resources. Such data management is conducted in accordance with predetermined algorithms. For example, the initial allocation and the destaging and migration are typically established by an administrator, or is dictated by a predetermined algorithm, or employs defaults in the data management system. As a specific example, U.S. Pat. No. 6,330,621 employs "policies" in making the initial allocation of storage components.

When a data entity is subsequently accessed, it is typically staged to a data storage resource directly coupled to the requesting agent, and other data entities are destaged from the coupled data storage resource to make room for the accessed data entity. The destaging is conducted in accordance with a predetermined algorithm, such as a LRU (least recently used) algorithm. Some advanced data management systems, such as employed in the IBM Enterprise Storage Server, have internal algorithms to identify application data access patterns and then change their internal processing algorithms in a predetermined manner to provide better performance, especially for transactional computing. The data resource allocations are thus done in accordance with predetermined algorithms or by hand-selection determinations by the administrator in advance.

SUMMARY OF THE INVENTION

The present invention comprises a data management system, a data management allocation system, a method, and a computer program product, for managing data of a storage system at run-time, where the storage system has a plurality of data storage resources of different characteristics.

In one embodiment, the data management system comprises at least one class distinction cue associated with a class of data entities, the class distinction cue comprising data management guidance information and priority information related to the associated class of data entities; and at least one data management allocation system for managing data entities of the storage system by allocating the data storage resources and providing operations of the storage system. At run-time, the data management allocation system references the class distinction cue(s) prior to conducting data management allocation with respect to a data entity of the associated class, and, based on the priority information as compared to other priority information related to the data storage resources, selectively allocates the data storage resources and provides the operations of the storage system in the data management allocation system for the data entity.

In a further embodiment, the data management system comprises an interface for providing and updating the class distinction cue(s) associated with a class of data entities. A GUI may provide information at the interface for providing and updating the class distinction cue or cues.

In another embodiment, the data management system additionally comprises an interface to a data management monitoring system that is responsive to updates from the data management monitoring system for updating the class distinction cue or cues.

In a still further embodiment, the class distinction cue is effective for a predetermined term, and/or is coupled to other class distinction cues, and the data management allocation system is responsive to the predetermined term and/or coupling, selectively allocating and reallocating the data storage resources and providing the operations of the storage system for the data entity.

In still another embodiment, the class distinction cue priority information comprises at least one input/output attribute of the class of data entities associated with the cue.

In a further embodiment, the class of data entities comprises any of a LUN, group of LUNs, storage pool, and object.

In another embodiment, the class distinction cues are in the form of a table.

In a still further embodiment, a first interface is provided for providing and updating the class distinction cue(s) associated with a class of data entities; and a second interface employing a user-oriented protocol is provided for allowing updating the class distinction cue(s) associated with a class of data entities. A GUI may provide information at the second interface for updating the class distinction cue or cues associated with a class of data entities.

In still another embodiment, the data management allocation system comprises an access system, at run-time, referencing at least one class distinction cue with respect to a data entity; a priority comparison system comparing the priority information of the class distinction cue(s) with respect to other priority information related to the data storage resources; and an allocation system responding to the priority comparison, selectively allocating the data storage resources and providing operations of the storage system for the data entity.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
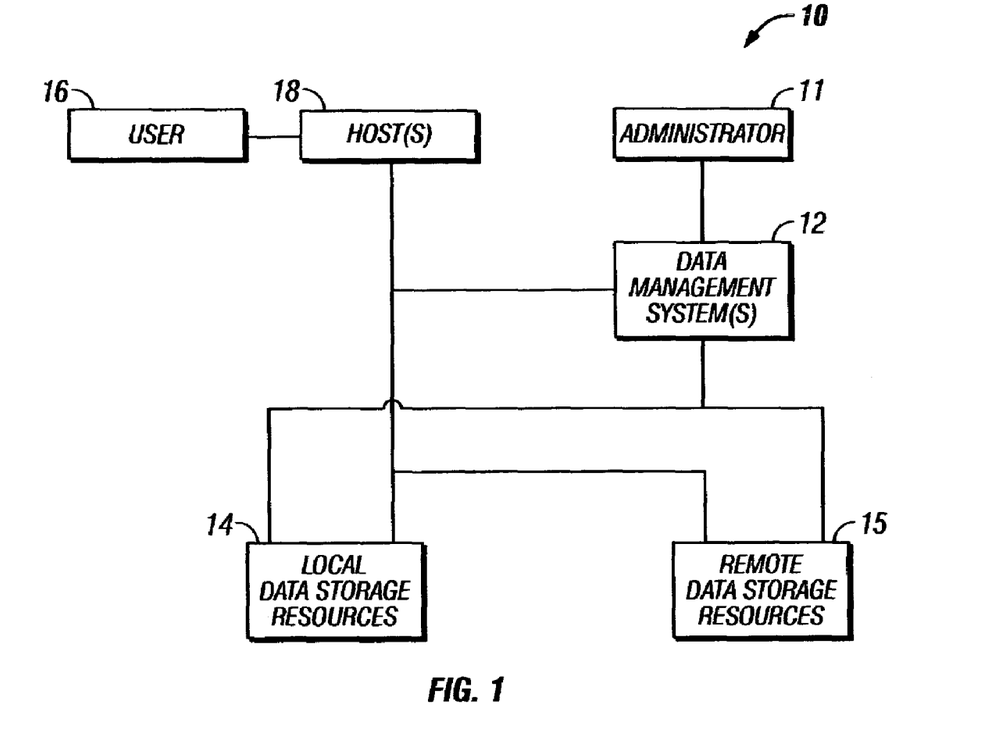
FIG. 1 is a block diagram of a data processing system and storage system with a data management system(s) which implement the present invention.

FIG. 1 illustrates in block diagram for an exemplary data processing system and storage system 10 with a data management system(s) 12 which implements the present invention. The exemplary storage system comprises both local data storage resources 14 and remote data storage resources 15. The data storage resources may comprise any server or servers and/or complex of devices that are capable of providing for the storage of data. The data storage resources comprise resources of different characteristics. Examples include data storage subsystems such as the IBM Enterprise Storage Server, cache memory (which may be a part of the subsystem or server), flash memory, magnetic disk drives in single or in RAID (redundant array of independent—or inexpensive—disks) configuration, magnetic tape drives in single or in library subsystem configuration, optical drives in single or in library subsystem configuration, etc.

The data management system(s) 12 comprises at least one programmable computer processor operating under the control of program code. The programmable computer processor may comprise any processor device known in the art, and may be implemented in a data storage server, a host, or a storage utility, or any storage facility between the host and the data entity, as is known to those of skill in the art. The method of the present invention may be provided in the form of a computer program product usable with a programmable computer processor having computer readable program code embodied therein, and may be supplied to the programmable computer processor in any of various ways as are known to those of skill in the art.

The data management system is controlled and administered by an administrator, for example, by use of one or more workstations or terminals and GUI (graphical user interface) interfaces 11, as is known in the art. The data management system is also controlled by a programmable interface for application programs to use, as well as a monitoring system to use, such as an end-to-end global monitor.

The exemplary data processing system and storage system 10 comprises host(s) 18 which communicate with the data storage resources 14, 15. Typically, the host(s) communicate with one or more end users, for example, by use of one or more workstations or terminals 16, as is known in the art.

Figure 2:
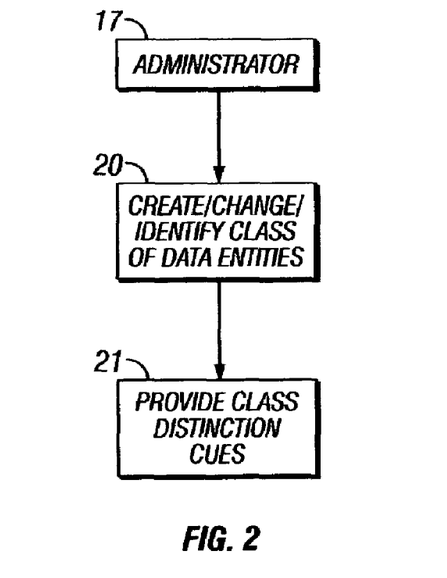
FIG. 2 is a flow chart depicting an embodiment of the present invention for providing class distinction cues for the data management system(s) of FIG. 1.

Referring additionally to FIG. 2, in accordance with an aspect of the present invention, the data management system 12 comprises at least one class distinction cue associated with a class of data entities. The class of data entities (there may only be a single data entity in a class) comprises any of a LUN (logical unit), group of LUNs, storage pool, and object. A LUN may comprise a volume or data set, or an application, and is typically mapped as a unit. A storage pool is a set of LUNs that are typically related. A LUN may belong to more than one, even different, storage pools. A directory of a LUN or of a storage pool may itself be a LUN.

An object is a generic term that comprises any of a LUN, storage pool, or a grouping of data that can be treated together. An application, such as a program product, may use a single LUN, a single pool (a data base or file system), a group of pools (several data bases and one or more file systems), or a group of objects in an object store.

The class of data entities are arranged in the class because they are to be treated alike for the purpose of data management. The data management system 12 may have defaults for establishing classes of data entities, and may have defaults for establishing at least one class distinction cue associated with a class of data entities. The data management system 12 may also be part of a program application or may receive cues from a program application.

Class distinction cues comprise data management guidance information and priority information related to the associated class of data entities. The term "cue" is employed to indicate that the cues are not a totally predetermined data management procedure. Rather, a data management allocation system is provided for managing data entities of the storage system by allocating the data storage resources and providing operations of the storage system, and, at run-time of a data management process for a data entity, the data management allocation system references the class distinction cue(s) prior to conducting data management allocation with respect to a data entity of the associated class, and, based on the priority information as compared to other priority information related to the data storage resources, selectively allocates the data storage resources and provides the operations of the storage system in the data management allocation system for the data entity. As defined herein, "allocation" comprises providing availability of, and access to, the data storage resources. "Run-time" comprises the initiation of a process or application involving or requiring use of a data management process.

As illustrated in FIGS. 1 and 2, the data management system 12 comprises an interface 17 for providing and updating the class distinction cue(s) associated with a class of data entities. A work station 11 and GUI may provide information at the interface 17 for, e.g., an administrator, to provide and update the class distinction cue or cues. The term "administrator" is defined as a person, or persons, or a program or programs performing administration. The administrator 17, in step 20, may create a class of data entities, may change a preexisting class of data entities, or identify a preexisting class of data entities, and the class is established by the data management system. As discussed above, classes of data entities may also be established by means of defaults of the data management system 12. Then, in step 21, the administrator 17 provides the class distinction cue or cues associated with the class of data entities of step 20, which association is provided in the data management system. Also as discussed above, the data management system 12 may have defaults for establishing class distinction cues.

Figure 3:
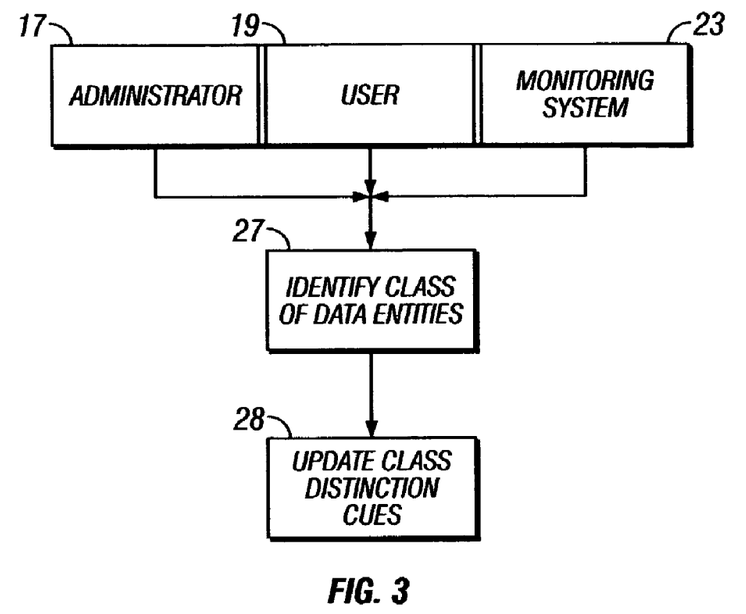
FIG. 3 is a flow chart depicting an embodiment of the present invention for updating class distinction cues for the data management system(s) of FIG. 1.

FIGS. 1 and 3 illustrate three alternative ways of updating class distinction cues. In one example, the administrator 17 provides the updates via the interface 17. In another example, a second interface 19 employing a user-oriented protocol, or a system, or a system component, is provided for allowing updating the class distinction cue(s) associated with a class of data entities. A workstation 16 and GUI may provide information at the second interface for updating the class distinction cue or cues associated with a class of data entities. Examples of a user-oriented protocol comprise HTML (HyperText Markup Language) or XML (extended Markup Language) script. Other examples are known to those of skill in the art. In a third example, the data management system additionally comprises an interface to a data management monitoring system 23 (both part of the data management systems 12), and is responsive to updates from the data management monitoring system for updating the class distinction cue or cues. The data management monitoring system 23 is defined as part of any of a data workload system, a storage management system, or an end-to-end workload monitoring system that ties together data workload and storage management to manage the workload (applications and their data) based on installation, or user-defined, quality of service requirements and attributes, such as priority, and that data be backed up on a time-specific basis.

In the example of FIG. 3, the class of data entities is identified in step 27 by the data management system 12 in accordance with the selection at the first interface 17, the second interface 14, or the monitoring system 23. Then, in step 28, in response to the updates initiated by the interface 17, the second interface 14, or the monitoring system 23, the data management system updates the class distinction cue or cues associated with the class of data entities of step 27, which association is provided in the data management system.

Figure 4:
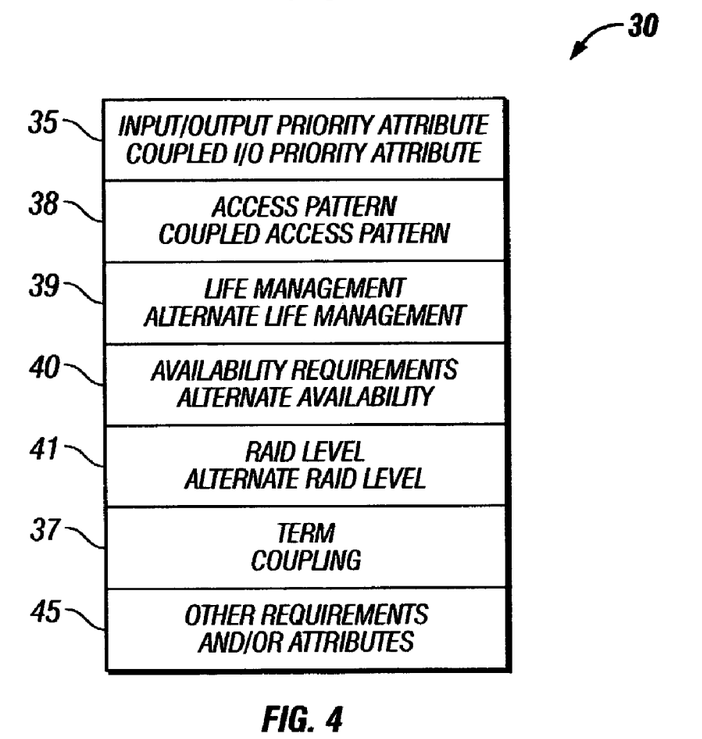
FIG. 4 is a diagrammatic representation of class distinction cues for the data management system(s) of FIG. 1.

FIG. 4 represents class distinction cues associated with a class of data entities. In FIG. 4, the class distinction cues are represented in the form of a table 30, which may comprise a LUN itself, or which may be accumulated with other tables by the data management system. The class distinction cues may alternatively comprise a collection of separately accessed words.

As discussed above, class distinction cues comprise data management guidance information and priority information related to the associated class of data entities.

In one embodiment, at least one class distinction cue priority information comprises at least one input/output attribute 35 of the class of data entities associated with the cue. Priorities are required for selection between competing data entities for the same storage resource, when that storage resource would otherwise be overloaded. Thus, high priority applications or devices are given access to the high priority data entities, and lower priority applications or devices are given access to the lower priority data entities. An example of input/output priority attributes is numerical ordering of priorities. For example, a LUN or storage pool having a migration application may be given a low input/output priority, and a data entity to be migrated may also have a low input/output priority, whereas a LUN or storage pool having a business critical application may be given a high priority. This allows the most important applications and data to have the best system response.

In one embodiment, a class distinction cue is effective for a predetermined term, and/or is coupled to other class distinction cues, as illustrated by cues 37, and the data management allocation system is responsive to the predetermined term and/or coupling, selectively allocating and reallocating the data storage resources and providing the operations of the storage system for the data entity.

For example, a class distinction cue indicating that a data entity has high input/output priority for a certain term comprises a cue for a LUN which comprising a directory for use in stock exchange activity, where the stock exchange is open on weekdays for certain hours, and the term extends from shortly before opening of the stock exchange until closing.

An example of a coupling of a class of data entities may be a coupling to another use of the data entities subsequent to the term. For example, the data entities may be accessed for billing and accounting purposes subsequent to the term, and the subsequent access may be at a different input/output priority 35. Another coupling may comprise a coupling of a data entity of a pool to a subsequent use of the processed data entity in another pool.

Another class distinction cue comprises the access pattern 38. As one example, the access pattern cue indicates that the data entity is to be read sequentially from beginning to end, such as seismic data. The data management system may employ the class distinction cue to prestage the data of the data entity. As another example, a class of data entities are accessed on a small record random transactional basis during a term, and then accessed on a sequential batch basis in the coupled use of the data entities. Many access patterns are known to those of skill in the art. Examples include read/write small record random, read/write small record semi-random, read/write small record sequential, read/write small record stride, read backward after write, etc. An access pattern may also comprise a sequence of actions, for example, initially reading data sequentially for a while, and, at some point, reading the same data sequentially backwards.

A further example of an access pattern class distinction cue 38 comprises a designation of a specific storage resource, for example, as the point at which the data entity is to be unloaded and archived, or, if an application, as the point at which the data entity is to focus its operation. A still further example, the specific storage resource specifies that the data entity is to be duplicated at a remote storage resource. Another access pattern class distinction cue comprises cache management algorithms, e.g., by partitioning, and by appending or associating data entities.

Another class distinction cue comprises life management 39. As one example, the life management class distinction cue may say that the data entity in this class is to be maintained in its current form as a LUN, or in the same storage pool, for 30 days from the last processing, and then migrated to tape. Many life management arrangements are known to those of skill in the art. An alternate life management class distinction cue 39 may be provided, in case the primary life management process cannot be performed by the data management system.

Still another class distinction cue comprises availability requirements 40. As an example, an availability requirement cue may indicate that the data entity should always be synchronously copied. Many availability requirements are known to those of skill in the art. Examples comprise flash copying, swapping, etc. If the data entity is an application, an availability requirement may be that the data for the application should be made available in a certain way, such as flash copied target. An alternate availability requirement class distinction cue 40 may be that, if the data entity cannot be synchronously copied, the data entity is asynchronously copied. A further availability class distinction cue 40 may be that, if some performance threshold is not being met, that the data is flash copied to make additional copies to speed performance.

Another class distinction cue comprises the RAID level 41. As known to those of skill in the art, RAID levels extend from RAID level 0, to RAID levels of ever greater complexity and/or redundancy, and may employ different types of resources, now extending to redundant tape or optical drives, and to redundant libraries. An alternate RAID level 41 may indicate that, if the lower RAID level is unavailable, a higher level, or different type of RAID is to be used.

Other class distinction cue requirements and/or attributes 45 may be envisioned by those of skill in the art.

Referring to FIGS. 3 and 4, in accordance with the present invention, a user 19 updates the class distinction cues 30, first identifying the class of data entities 27 whose cue or cues are to be updated. This is accomplished, for example, with an interface employing a GUI and user-oriented protocol. The user may then update the cue or cues 28 with information that is not easily knowable by the administrator 17. As one example, a user may indicate in the class distinction cue, that the access pattern 38 is, in addition reading the data entity of the class sequentially from beginning to end, the data entity is reversed and re-read from end to beginning. Hence, the data management system, when accessing the updated cue, prestages the data in the reverse direction.

In accordance with FIGS. 3 and 4, the class distinction cues are dynamic and not fixed, and may be updated by both the user 19 and the administrator 17, and may be updated automatically by a monitoring system 23.

Figure 5:
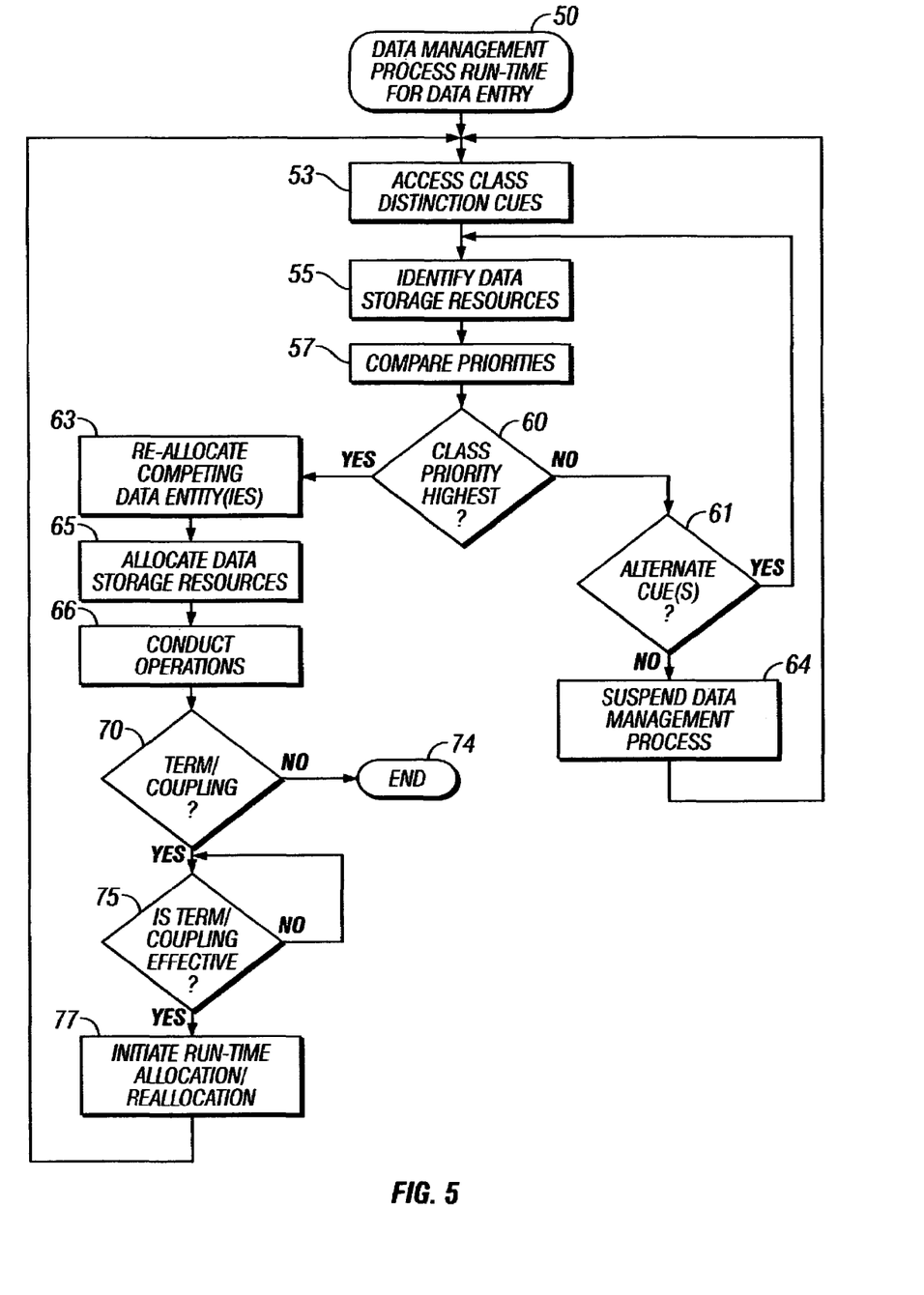
FIG. 5 is a flow chart depicting an embodiment of computer implemented methods of the present invention for run-time data management.

An embodiment of a computer-implemented run-time method in accordance with the present invention for implementing the use of the class distinction cues is illustrated in FIG. 5. Rather than having the administrator hand-select the storage resources and predetermine their use in advance, the present invention provides the class distinction cues to assist the data management system to evaluate the competing interests and select the storage resources appropriate to the activity and data entity at run-time, giving effect to the competing priorities, for example, beginning at step 50.

In step 53, the data management system, or data management allocation system, or allocation access system, accesses the class distinction cue or cues, e.g., at table 30 of FIG. 4, for the data entity of that class that is the subject of the run-time process. Multiple cues for a plurality of data entities that represent aspects of a data management process may be accessed at the same time. For example, a data management application may comprise one data entity having one set of cues, and another data entity may be the target of the data management application.

In step 55 of FIG. 5, the data management system identifies data storage resources consistent with the class distinction cues. Examples of data storage resources are discussed above. In the event that multiple data storage resources of the same type are available, the most available data storage resources may be selected. For example, a RAID system whose data has been migrated and has sufficient available space is selected over one in the process of loading other data.

In step 57, the priorities are compared with respect to the identified data storage resource(s). The priority comparison is conducted by a priority comparison system, or the data management system, etc., as above. The comparison is not just between the present data entity and those of other classes whose data management processes are to be conducted with respect to the identified data storage resource(s), but also with priorities of other, non-data management processes which are competing for similar storage resources at the same time.

In step 60, the determination is made whether the present data entity class distinction priority is higher than the priorities with respect to those competing for the same identified data storage resource(s). If not, in step 61, an alternate cue or cues may be consulted, e.g., at table 30 of FIG. 4, for the data entity of that class that is the subject of the run-time process. If there are alternate cue(s), the process cycles back to step 55 of FIG. 5 to identify data storage resources consistent with the alternate class distinction cue(s).

If not, the data management process which would, at run-time, use the data storage resources is suspended in step 64. At some point, the class distinction cues would again be accessed in step 53. The time between step 64 and the re-initiation of step 53 may be dependent upon the priority of the class of data entities that are the subject of the run-time process, with the lower priority delay being longer than a higher priority delay.

If step 60 indicates that the present priority is highest, lower priority competing data entities and processes are reallocated to alternative storage resource(s) in step 63, or are suspended, and the data entities saved, or an existing process is allowed to complete, freeing the storage resource(s).

Once the data storage resource(s) are available, they are allocated to the present data entity in step 65, and the data management process operations are initiated in step 66. The allocation is conducted by an allocation system, or the data management system, etc., as above.

Step 70 is shown after step 66, but may occur at any point in the process of FIG. 5, and may appear at many locations in the process. In step 70, the data management system determines whether there are term and/or coupling class distinction cues for the present data entity. If not, the class distinction cue process is ended in step 74. If so, step 75 determines whether the term and/or coupling is effective at the present time. For example, the term has not yet started, but is imminent, and when started is "effective". Alternatively, the term may have begun and have resulted in reaching steps 70 and 75, and the steps are now determining whether the end of the term has been reached, thus, "effective". As another example, steps 70 and 75 may be concerned with the coupling, which may be coincident with the beginning of the present data management process, and therefore "effective", or may be coincident with the end of the present data management process, or another time.

If step 75 determines that the term and/or coupling is not effective, the process cycles back to make the check again, in a loop, perhaps with a time delay, until the term and/or coupling is effective.

Upon step 75 determining that the term and/or coupling is effective, the run-time allocation or reallocation is initiated in step 77. This may comprise another access of class distinction cues in step 53 in order to conduct the run-time allocation or reallocation required by the term and/or coupling.

The illustrated components of the data management system(s) and data processing system and storage system of FIG. 1, and the arrangement of the class distinction cues of FIG. 4 may be varied, combined, or combined functions may be separated, as is known to those of skill in the art. The illustrated steps of FIGS. 2, 3 and 5 may be altered in sequence, omitted, or other steps added, as is known to those of skill in the art.

While the preferred embodiments of the present invention have been illustrated in detail, it should be apparent that modifications and adaptations to those embodiments may occur to one skilled in the art without departing from the scope of the present invention as set forth in the following claims.

We claim:

1. A data management system for managing data of a storage system, said storage system having a plurality of data storage resources of different characteristics, said data management system, comprising:

at least one class distinction cue associated with a class of data entities, said at least one class distinction cue comprising data management guidance information and priority information related to said associated class of data entities; and at least one data management allocation system for managing data entities of said storage system by allocating said data storage resources and providing operations of said storage system, said at least one data management allocation system, at run-time, referencing said at least one class distinction cue prior to conducting data management allocation with respect to a data entity of said associated class, and, based on said priority information as compared to other priority information related to said data storage resources, selectively allocating said data storage resources and providing said operations of said storage system in said data management allocation system for said data entity.

2. The data management system of claim 1, additionally comprising:

an interface for providing and updating said at least one class distinction cue associated with a class of data entities.

3. The data management system of claim 2, additionally comprising a GUI for providing information at said interface for providing and updating said at least one class distinction cue associated with a class of data entities.

4. The data management system of claim 2, additionally comprising:

an interface to a data management monitoring system responsive to updates from said data management monitoring system for updating said at least one class distinction cue associated with a class of data entities.

5. The data management system of claim 1, wherein said at least one class distinction cue associated with a class of data entities is effective for a predetermined term, and/or is coupled to other class distinction cues, and wherein said at least one data management allocation system is responsive to said predetermined term and/or coupled class distinction cues, selectively allocating and/or reallocating said data storage resources and providing said operations of said storage system in said data management allocation system for said data entity.

6. The data management system of claim 1, wherein said at least one class distinction cue priority information comprises at least one input/output attribute of said class of data entities associated with said cue.

7. The data management system of claim 1, wherein said class of data entities comprises any of a LUN, group of LUNs, storage pool, and object.

8. The data management system of claim 1, wherein said at least one class distinction cue is in the form of a table.

9. A data management system for managing data of a storage system, said storage system having a plurality of data storage resources of different characteristics, said data management system comprising:

at least one class distinction cue associated with a class of data entities, said at least one class distinction cue comprising data management guidance information and priority information related to said associated class of data entities;

a first interface for providing and updating said at least one class distinction cue associated with a class of data entities;

a second interface employing a user-oriented protocol allowing updating said at least one class distinction cue associated with a class of data entities; and at least one data management allocation system for managing data entities of said storage system by allocating said data storage resources and providing operations of said storage system, said at least one data management allocation system, at run-time, referencing said at least one class distinction cue prior to conducting data management allocation with respect to a data entity of said associated class, and, based on said priority information as compared to other priority information related to said data storage resources, selectively allocating said data storage resources and providing said operations of said storage system in said data management allocation system for said data entity.

10. The data management system of claim 9, additionally comprising a GUI for providing information at said second interface for updating said at least one class distinction cue associated with a class of data entities.

11. A data management allocation system for managing data entities of a storage system, said storage system having a plurality of data storage resources of different characteristics, said data management allocation system comprising:

an access system, at run-time, referencing at least one class distinction cue with respect to a data entity, said at least one class distinction cue associated with a class of data entities, said at least one class distinction cue comprising data management guidance information and priority information related to said associated class of data entities;

a priority comparison system comparing said priority information of said at least one class distinction cue with respect to other priority information related to said data storage resources; and an allocation system responding to said priority comparison, selectively allocating said data storage resources and providing operations of said storage system for said data entity.

12. A data storage system, comprising:

a plurality of data storage resources of different characteristics;

at least one class distinction cue associated with a class of data entities, said at least one class distinction cue comprising data management guidance information and priority information related to said associated class of data entities; and at least one data management allocation system for managing data entities of said storage system by allocating said data storage resources and providing operations of said storage system, said at least one data management allocation system, at run-time, referencing said at least one class distinction cue prior to conducting data management allocation with respect to a data entity of said associated class, and, based on said priority information as compared to other priority information related to said data storage resources, selectively allocating said data storage resources and providing said operations of said storage system in said data management allocation system for said data entity.

13. The data storage system of claim 12, additionally comprising:

an interface for providing and updating said at least one class distinction cue associated with a class of data entities.

14. The data storage system of claim 13, additionally comprising a GUI for providing information at said interface for providing and updating said at least one class distinction cue associated with a class of data entities.

15. The data storage system of claim 13, additionally comprising:
an interface to a data management monitoring system responsive to updates from said data management monitoring system for updating said at least one class distinction cue associated with a class of data entities.

16. The data storage system of claim 12, wherein said at least one class distinction cue associated with a class of data entities is effective for a predetermined term, and/or is coupled to other class distinction cues, and wherein said at least one data management allocation system is responsive to said predetermined term and/or coupled class distinction cues, selectively allocating and/or reallocating said resources and providing said operations of said storage system in said data management allocation system for said data entity.

17. The data storage system of claim 12, wherein said at least one class distinction cue priority information comprises at least one input/output attribute of said class of data entities associated with said cue.

18. The data storage system of claim 12, wherein said class of data entities comprises any of a LUN, group of LUNs, storage pool, and object.

19. The data storage system of claim 12, wherein said at least one class distinction cue is in the form of a table.

20. A data storage system, comprising:
a plurality of data storage resources of different characteristics;
at least one class distinction cue associated with a class of data entities, said at least one class distinction cue comprising data management guidance information and priority information related to said associated class of data entities;
a first interface for providing and updating said at least one class distinction cue associated with a class of data entities;
a second interface employing a user-oriented protocol allowing updating said at least one class distinction cue associated with a class of data entities; and
at least one data management allocation system for managing data entities of said storage system by allocating said data storage resources and providing operations of said storage system, said at least one data management allocation system, at run-time, referencing said at least one class distinction cue prior to conducting data management allocation with respect to a data entity of said associated class, and, based on said priority information as compared to other priority information related to said data storage resources, selectively allocating said data storage resources and providing said operations of said storage system in said data management allocation system for said data entity.

21. The data storage system of claim 20, additionally comprising a GUI for providing information at said second interface for updating said at least one class distinction cue associated with a class of data entities.

22. A method for managing data of a storage system, said storage system having a plurality of data storage resources of different characteristics, said data management method comprising the steps of:
providing at least one class distinction cue associated with a class of data entities, said at least one class distinction cue comprising data management guidance information and priority information related to said associated class of data entities;
for a data entity of said associated class, at run-time, referencing said at least one class distinction cue; and
subsequently, based on said priority information as compared to other priority information related to said data storage resources, selectively allocating said data storage resources and providing operations of said storage system for said data entity.

23. The data management method of claim 22, wherein said storage system additionally comprises an interface to said cue, and wherein said providing step comprises:
providing and updating said at least one class distinction cue associated with a class of data entities via said interface.

24. The data management method of claim 23, wherein said storage system additionally comprises a data management monitoring system, and said data management method additionally comprises the step of:
responding to updates from said data management monitoring system, updating said at least one class distinction cue associated with a class of data entities.

25. The data management method of claim 22, wherein:
said step of providing at least one class distinction cue additionally comprises indicating said at least one class distinction cue associated with a class of data entities is effective for a predetermined term, and/or is coupled to other class distinction cues; and
said steps of referencing said at least one class distinction cue for a data entity, and of selectively allocating said data storage resources and providing operations of said storage system for said data entity, additionally comprise responding to said predetermined term and/or coupled class distinction cues, selectively allocating and/or reallocating said data storage resources and providing said operations of said storage system for said data entity.

26. The data management method of claim 22, wherein said step of providing said at least one class distinction cue comprises providing at least one class distinction priority information input/output attribute of said class of data entities associated with said cue.

27. The data management method of claim 22, wherein said class of data entities comprises any of a LUN, group of LUNs, storage pool, and object.

28. The data management method of claim 22, wherein said step of providing said at least one class distinction cue comprises providing said at least one class distinction cue in the form of a table.

29. A method for managing data of a storage system, said storage system having a plurality of data storage resources of different characteristics, having a first interface, and having a second interface, said data management method comprising the steps of:
providing at least one class distinction cue associated with a class of data entities, said at least one class distinction cue comprising data management guidance information and priority information related to said associated class of data entities via said first interface;
updating said at least one class distinction cue associated with a class of data entities via said first interface, and via said second interface;
for a data entity of said associated class, at run-time, referencing said at least one class distinction cue; and
subsequently, based on said priority information as compared to other priority information related to said data storage resources, selectively allocating said data storage resources and providing operations of said storage system for said data entity.

30. A method for managing data entities of a storage system, said storage system having a plurality of data storage resources of different characteristics, said method comprising the steps of:
   at run-time, referencing at least one class distinction cue with respect to a data entity, said at least one class distinction cue associated with a class of data entities, said at least one class distinction cue comprising data management guidance information and priority information related to said associated class of data entities;
   comparing said priority information of said at least one class distinction cue with respect to other priority information related to said data storage resources; and
   based on said comparing step, selectively allocating said data storage resources and providing operations of said storage system for said data entity.

31. A computer program product usable with a programmable computer processor system having computer readable program code embodied therein, said programmable computer processor system for managing data of a storage system, said storage system having a plurality of data storage resources of different characteristics, said computer program product comprising:
   computer readable program code which causes said programmable computer processor system to provide at least one class distinction cue associated with a class of data entities, said at least one class distinction cue comprising data management guidance information and priority information related to said associated class of data entities; and
   computer readable program code which causes said programmable computer processor system to conduct a data management process for managing said storage system by allocating said data storage resources and providing operations of said storage system, said computer readable program code causing said programmable computer processor system, at run-time, to reference said at least one class distinction cue prior to conducting said data management process with respect to a data entity of said associated class, and, based on said priority information as compared to other priority information related to said data storage resources, selectively allocating said data storage resources and providing said operations of said storage system in said data management process for said data entity.

32. The computer program product of claim 31, wherein said computer readable program code additionally causes said programmable computer processor system to provide an interface for providing and updating said at least one class distinction cue associated with a class of data entities.

33. The computer program product of claim 32, wherein said computer readable program code additionally causes said programmable computer processor system to provide a GUI for providing information at said interface for providing and updating said at least one class distinction cue associated with a class of data entities.

34. The computer program product of claim 31, wherein said computer readable program code additionally causes said programmable computer processor system to provide an interface to a data management monitoring system, and causes said programmable computer processor system to respond to updates from said data management monitoring system, updating said at least one class distinction cue associated with a class of data entities.

35. The computer program product of claim 31, wherein said at least one class distinction cue associated with a class of data entities is effective for a predetermined term, and/or is coupled to other class distinction cues, and wherein said computer readable program code which causes said programmable computer processor system to conduct a data management process additionally causes said programmable computer processor system to respond to said predetermined term and/or coupled class distinction cues, selectively allocating and/or reallocating said data storage resources and providing said operations of said storage system in said data management process for said data entity.

36. The computer program product of claim 31, wherein said at least one class distinction cue priority information comprises at least one input/output attribute of said class of data entities associated with said cue.

37. The computer program product of claim 31, wherein said class of data entities comprises any of a LUN, group of LUNs, storage pool, and object.

38. The computer program product of claim 31, wherein said at least one class distinction cue is in the form of a table.

39. A computer program product usable with a programmable computer processor system having computer readable program code embodied therein, said programmable computer processor system for managing data of a storage system, said storage system having a plurality of data storage resources of different characteristics, said computer program product comprising:
   computer readable program code which causes said programmable computer processor system to provide a first interface;
   computer readable program code which causes said programmable computer processor system to provide a second interface;
   computer readable program code which causes said programmable computer processor system to provide, via said first interface, at least one class distinction cue associated with a class of data entities, said at least one class distinction cue comprising data management guidance information and priority information related to said associated class of data entities;
   computer readable program code which causes said programmable computer processor system to update, via said first interface, and via said second interface, said at least one class distinction cue associated with a class of data entities; and
   computer readable program code which causes said programmable computer processor system to conduct a data management process for managing said storage system by allocating said data storage resources and providing operations of said storage system, said computer readable program code causing said programmable computer processor system, at run-time, to reference said at least one class distinction cue prior to conducting said data management process with respect to a data entity of said associated class, and, based on said priority information as compared to other priority information related to said data storage resources, selectively allocating said data storage resources and providing said operations of said storage system in said data management process for said data entity.

40. The computer program product of claim 39, wherein said computer readable program code additionally causes said programmable computer processor system to provide a GUI for providing information at said second interface for updating said at least one class distinction cue associated with a class of data entities.

41. A computer program product usable with a programmable computer processor system having computer readable program code embodied therein, said programmable computer processor system for managing data of a storage system, said storage system having a plurality of data storage resources of different characteristics, said computer program product comprising:

computer readable program code which causes said programmable computer processor system to, at run-time, reference at least one class distinction cue with respect to a data entity, said at least one class distinction cue associated with a class of data entities, said at least one class distinction cue comprising data management guidance information and priority information related to said associated class of data entities;

computer readable program code which causes said programmable computer processor system to compare said priority information of said at least one class distinction cue with respect to other priority information related to said data storage resources; and     computer readable program code which causes said programmable computer processor system to, based on said priority comparison, selectively allocate said data storage resources and provide operations of said storage system for said data entity.

\* \* \* \* \*